United States Patent [19]

Syme et al.

[11] Patent Number: 4,487,195

[45] Date of Patent: Dec. 11, 1984

[54] FUEL BURNING HEATING APPARATUS

[75] Inventors: Duncan C. Syme, Chelsea; Eldon L. Caldwell, Barnard; Robert W. Ferguson, South Royalton; Derik K. Andors, Randolph; Charles B. McLaughlin, Jr., Rutland, all of Vt.

[73] Assignee: Vermont Castings, Inc., Randolph, Vt.

[21] Appl. No.: 430,471

[22] Filed: Sep. 30, 1982

[30] Foreign Application Priority Data

Jun. 1, 1982 [GB] United Kingdom ............... 8215946

[51] Int. Cl.³ .............................................. F24C 1/14
[52] U.S. Cl. ........................................ 126/77; 126/76; 126/152 R; 126/83; 126/126
[58] Field of Search ................. 126/77, 126, 121, 129, 126/131, 112, 15 R, 60, 61, 76, 83, 193, 200, 285 R, 289, 152 R, 152 B

[56] References Cited

U.S. PATENT DOCUMENTS

| 1,034,799 | 8/1912 | Hugy | 126/77 |
|---|---|---|---|
| 1,885,152 | 11/1932 | Stehli | 126/152 R |
| 1,974,373 | 9/1934 | Whitfield | 126/152 R |
| 2,114,772 | 4/1938 | Althoff | 126/77 |
| 2,465,559 | 3/1949 | Urban | 126/152 X |
| 2,481,165 | 9/1949 | Landry | 126/76 |
| 4,279,238 | 7/1981 | Syme | 126/77 |
| 4,368,722 | 1/1983 | Lynch | 126/83 X |

FOREIGN PATENT DOCUMENTS

| 0037281 | 3/1981 | European Pat. Off. . |
| 0040100 | 5/1981 | European Pat. Off. . |
| 0047996 | 9/1981 | European Pat. Off. . |
| 1135646 | 5/1966 | United Kingdom . |
| 1590772 | 3/1978 | United Kingdom . |
| 2056052 | 8/1979 | United Kingdom . |
| 2081884 | 7/1980 | United Kingdom . |

Primary Examiner—Larry Jones
Attorney, Agent, or Firm—Kenway & Jenney

[57] ABSTRACT

A heating apparatus for operating in one or the other of two combustion modes has a frame assembly enclosing a primary and secondary combustion chamber. A baffle, separating the chambers, provides for gaseous communication therebetween. Preheated primary and secondary combustion air is directed in a controlled fashion to the front of the frame assembly across a viewing window to keep the window clear. The apparatus further has an off center damper movement system, means for defining a secondary air flow path through the primary combustion chamber, and a structure which can be changed for operation either as a wood burning or a coal burning stove.

26 Claims, 12 Drawing Figures

FUEL BURNING HEATING APPARATUS

BACKGROUND OF THE INVENTION

The invention relates generally to an airtight fuel burning heating apparatus and in particular to heating apparatus having a small size for burning either wood or coal.

For the past few years, the increase in the price of oil and gas fuels has promoted development of a plethora of wood and/or coal burning heating apparatus. The vast majority of the apparatus have been directed to providing a residential dwelling with heat to reduce the fuel consumption of or to eliminate the conventional oil or gas burner. The apparatus have also been employed as a replacement for the typical home fireplace which is itself an inefficient heater.

One class of particularly efficient stoves incorporate controlled air inlets. These stoves, often termed "airtight", can have many different configurations. Three of the airtight stoves which have been particularly successful are manufactured by the assignee of this invention and are capable of operation using a horizontal combustion principle. They are named the Defiant, the Vigilant, and the Resolute, all manufactured by Vermont Castings, Inc. of Randolph, Vt. These stoves have varying heat outputs and at maximum burning capacity can provide, in the Defiant stove, up to about 55,000 BTU's of energy. This large heat output, while desirable for heating large volumes, can clearly overpower the typical family room or den into which the stoves are often placed. As a result, the Resolute stove, a "small brother" to the Defiant and Vigilant stove family, was developed and is presently commercially available.

In addition, as the use of coal and wood becomes more popular, the Vigilant and Resolute stoves can provide the home user the option of operating his apparatus in either a coal burning or a wood burning configuration. However, even the smaller Resolute stove is still large, at least with respect to being employed in the typical opening of a residential fireplace. As a result, it became clear that a yet smaller stove, preferably capable of burning either coal or wood, would be necessary.

As the physical size of the stoves decreases, it also became apparent that merely scaling down the existing stoves would not be practical. Furthermore, it was desirable to simplify yet further the construction of the stoves while maintaining the high efficiency and reliability for which the Vermont Castings stoves were known. As a result, a new and novel design for a stove was developed.

It is therefore an object of the invention to provide a heating apparatus having a reduced physical size while maintaining high efficiency. Other objects of the invention are a heating apparatus having a simple and reliable construction, low manufacturing and assembly costs, and ease of maintenance. A further object of the invention is a heating apparatus capable of being configured to burn efficiently either coal or wood.

SUMMARY OF THE INVENTION

The invention relates generally to a heating apparatus capable of operating in either a first or a second combustion mode. The heating apparatus has a heat conducting frame enclosing a primary combustion chamber and a secondary combustion chamber in gaseous communication therewith. The apparatus preferably has a baffle or fireback, a portion of the baffle separating the primary and secondary combustion chambers, and the baffle preferably has a first baffle opening gaseously connecting the primary and secondary combustion chambers for providing the gaseous communication therebetween. A first air supply path defining assembly provides air for promoting combustion in the primary combustion chamber and the frame member includes a door assembly having a transparent portion positioned for visual viewing of combustion occurring in the primary combustion chamber. The air supply assembly features an ambient air inlet port in a frame panel of the frame assembly, elements for defining combined primary and secondary air supply paths which direct air from the inlet port along a plurality of separate, closed, defined, elongated paths toward the door assembly at the front panel of the apparatus, and additional elements for directing the air from the respective supply paths at the door assembly along an inside surface thereof and across the transparent portion of the assembly. Thereby, uncombusted air is directed or washed across the transparent portion of the door assembly for maintaining the transparent portion clean and effectively insulating it from the products of combustion within the primary combustion chamber. After traversing the transparent portion, the air divides into lower primary and upper secondary air paths. The lower primary air path directs combustion air directly into the fuel mass. The upper secondary path leads uncombusted air around the upper periphery of the primary combustion chamber to the first baffle opening.

In particular embodiments of the invention, the heating apparatus features a combined primary and secondary air path which substantially encircles the frame assembly and provides at least first and second paths extending from the inlet port in a rear panel of the frame and from thence respectively along substantially the entire of the first and second side panels of the frame. The air, as it reaches the front of the apparatus, is directed upward and across the transparent portion by a U-shaped bracket and clamp member, the bracket portion being in gaseous communication with the primary air path for directing air supplied therefrom to the transparent portion and the clamping member being integral therewith for supporting the transparent portion in position on the door assembly.

The baffle preferably has an upper and a lower member. In one aspect, the lower member extends the full width of the frame while the upper member and lower member together extend substantially the full height of the frame. The baffle members together define the first baffle opening for operation of the apparatus in the first combustion mode and the upper baffle defines a second baffle opening for operation in the second combustion mode.

The heating apparatus further features a damper, which can extend less than the full width of the frame, and means for mounting the damper for movement between a first position, wherein it allows passage of gaseous products of combustion through the second baffle opening to an exit port, and a second position wherein the damper blocks said second baffle opening. The apparatus further features a handle assembly for rotating the damper between the first and second positions wherein the handle assembly has a handle rotation axis which is not coaxial with the rotation axis of the damper. As a result, associated with the damper is a damper movement slot, formed integrally with the damper, and which engages an end portion of the handle assembly for sliding movement as the damper rotates, whereby rotational movement of the damper is effected.

The frame assembly, in order to maintain a small size, has a rearwardly extending, box-like shaped secondary combustion supporting protruding frame section mounted at an upper central position in a supporting opening of the rear panel. The protruding section is accessible from the door assembly of the apparatus and has a plurality of removable refractory elements maintained therein for defining, in combination with the section, the secondary combustion chamber and the flue path extending from the secondary chamber to the flue gas exit aperture.

The apparatus does not have a separately defined, structurally enclosed, air path for supporting secondary combustion. Rather, a unique primary air supply path is provided whereby a portion of the primary air is directed along the structurally open inside walls of the primary combustion chamber to the secondary combustion chamber. Thereat, the apparatus further features a structure for aiding in the collection of the oxygen rich primary air circulating from the primary air supply path through the primary combustion chamber for promoting secondary combustion in the secondary combustion chamber. Importantly also, the first baffle opening extends substantially in a horizontal direction and is positioned at a height above the primary combustion chamber base and below the primary chamber top wall for enhancing the collection of the oxygen rich uncombusted primary air.

DESCRIPTION OF THE DRAWINGS

Other objects, features, and advantages of the invention will appear from the following description of a preferred embodiment taken together with the drawings in which.

DESCRIPTION OF A PREFERRED EMBODIMENT

Figure 1:
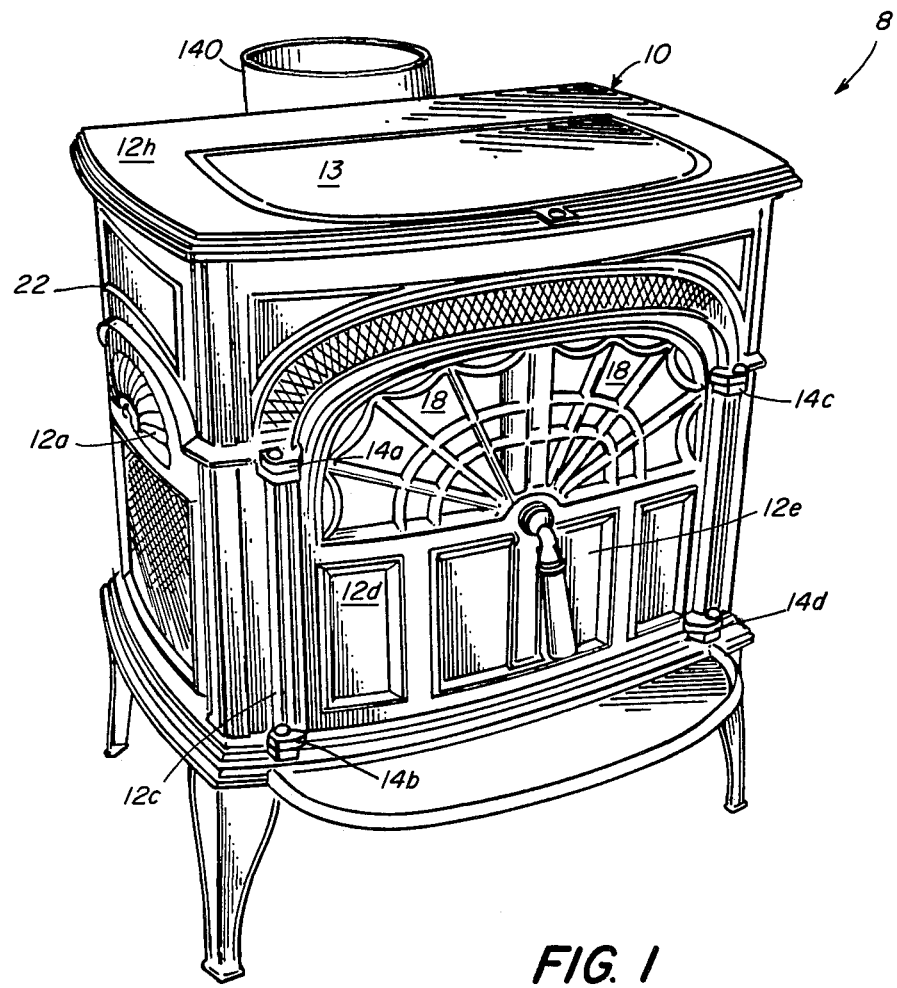
FIG. 1 is a front perspective view of the apparatus according to the invention.
Figure 2:
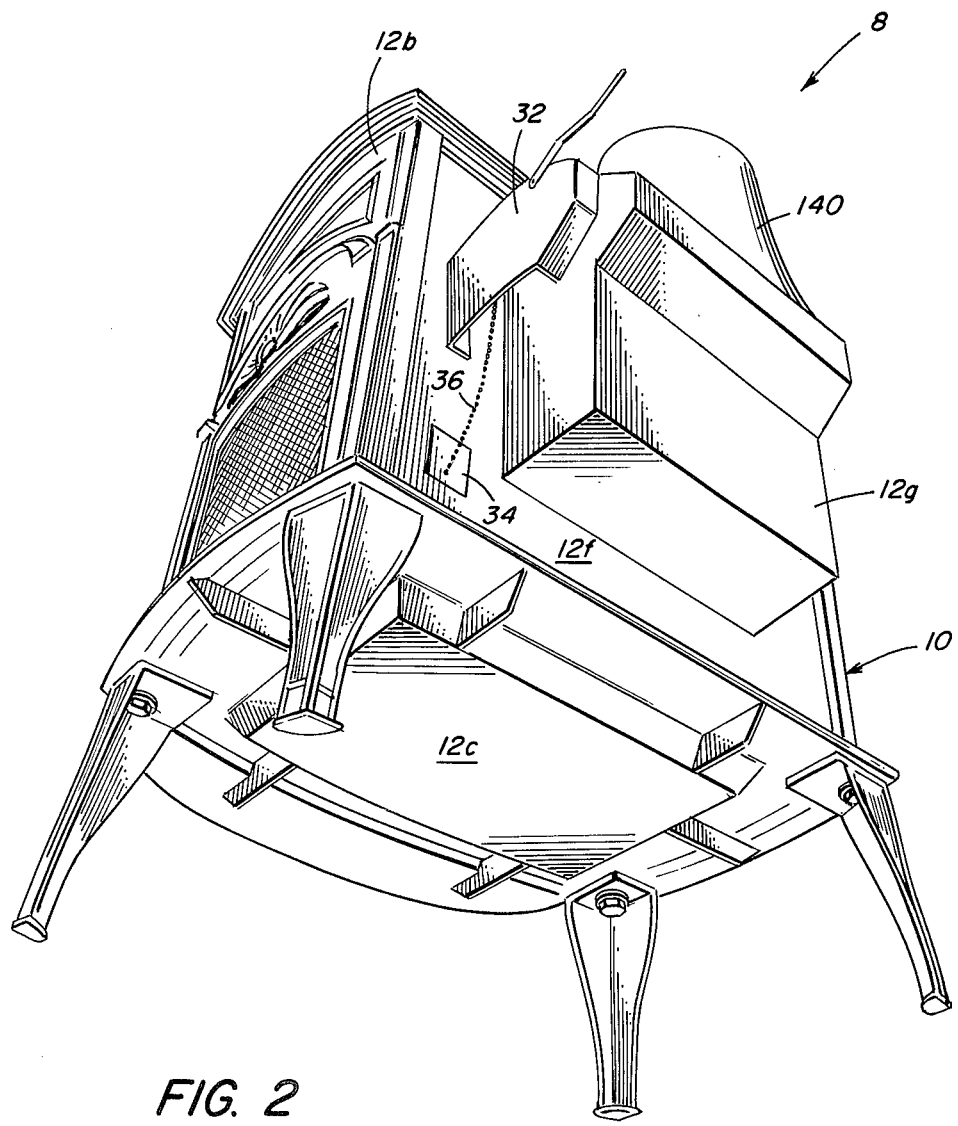
FIG. 2 is a bottom rear perspective view of the apparatus according to the invention.

Referring to FIGS. 1 and 2, a heating apparatus 8 has an exterior frame assembly 10 preferably manufactured using a heavy-duty cast iron. The sides 12a, 12b, front 12c with doors 12d, 12e, back 12f with protruding section 12g, top 12h, and bottom 12i of the frame assembly are joined in a channeled construction to form an integral, air tight unit. Top 12h has a pivoting loading door 13. The front pivoting doors 12d and 12e, which pivot respectively on hinges 14a, 14b and 14c, 14d, allow the heating apparatus to be opened from the front for both loading wood into a primary combustion chamber 16 (FIG. 3) when the apparatus is operated as a wood burning heating apparatus and for loading coal into the primary combustion chamber 16 (FIG. 4) when the apparatus is operated as a coal burning apparatus. The doors 12d, 12e can be left open for viewing the fire when the heating apparatus is employed in the same mode of combustion used in a fireplace; or, in their closed position wherein the doors seal against gasketing material such as an inert mineral fiber woven rope sealing member, the combustion can be viewed through transparent portions of the doors which are sealed, on the interior side of the cast door members, by a transparent material such has heat treated, tempered safety glass 18.

Figure 5:
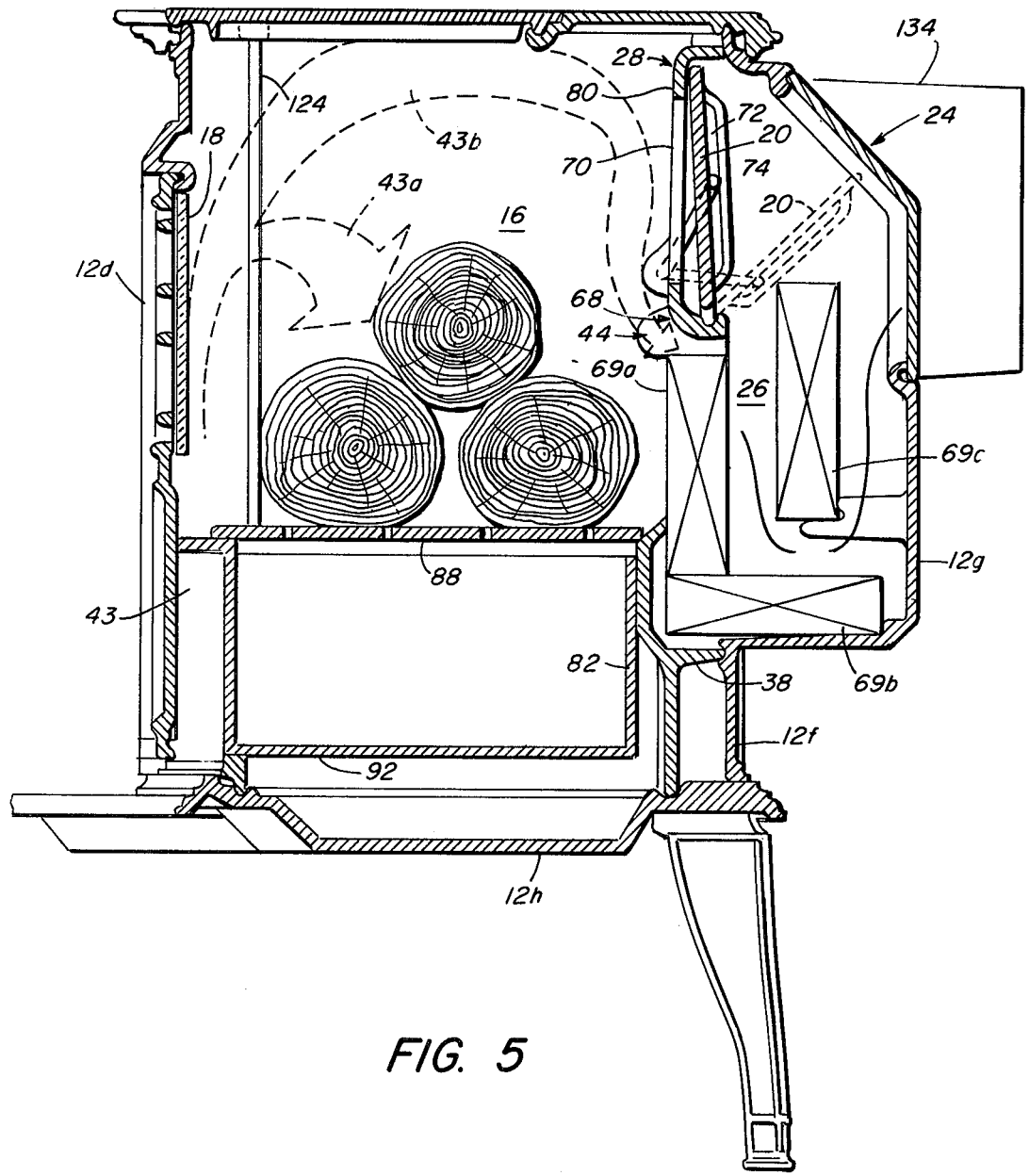
FIG. 5 is a cross-sectional side view along lines 5—5 of FIG. 1.

The heating apparatus 8 is structured to operate in two combustion modes. The determination of combustion mode is effected by the position of a damper 20 (FIG. 5) whose position is controlled by a handle 22 of a handle assembly. In one position of the damper, the apparatus operates in an updraft combustion configuration wherein the flue gases leave the primary combustion chamber and are permitted to exit substantially directly through a flue collar exit opening 24 (FIG. 5). In a second position of the damper, the apparatus operates in a high efficiency mode wherein a secondary combustion chamber 26 (FIGS. 3 and 5) is formed just past a baffle 28 separating the primary combustion chamber from the protruding section 12g of the apparatus. The apparatus in this mode of combustion provides a significant high efficiency and a relatively longer internal exit path for the combustion gases.

Figure 3:
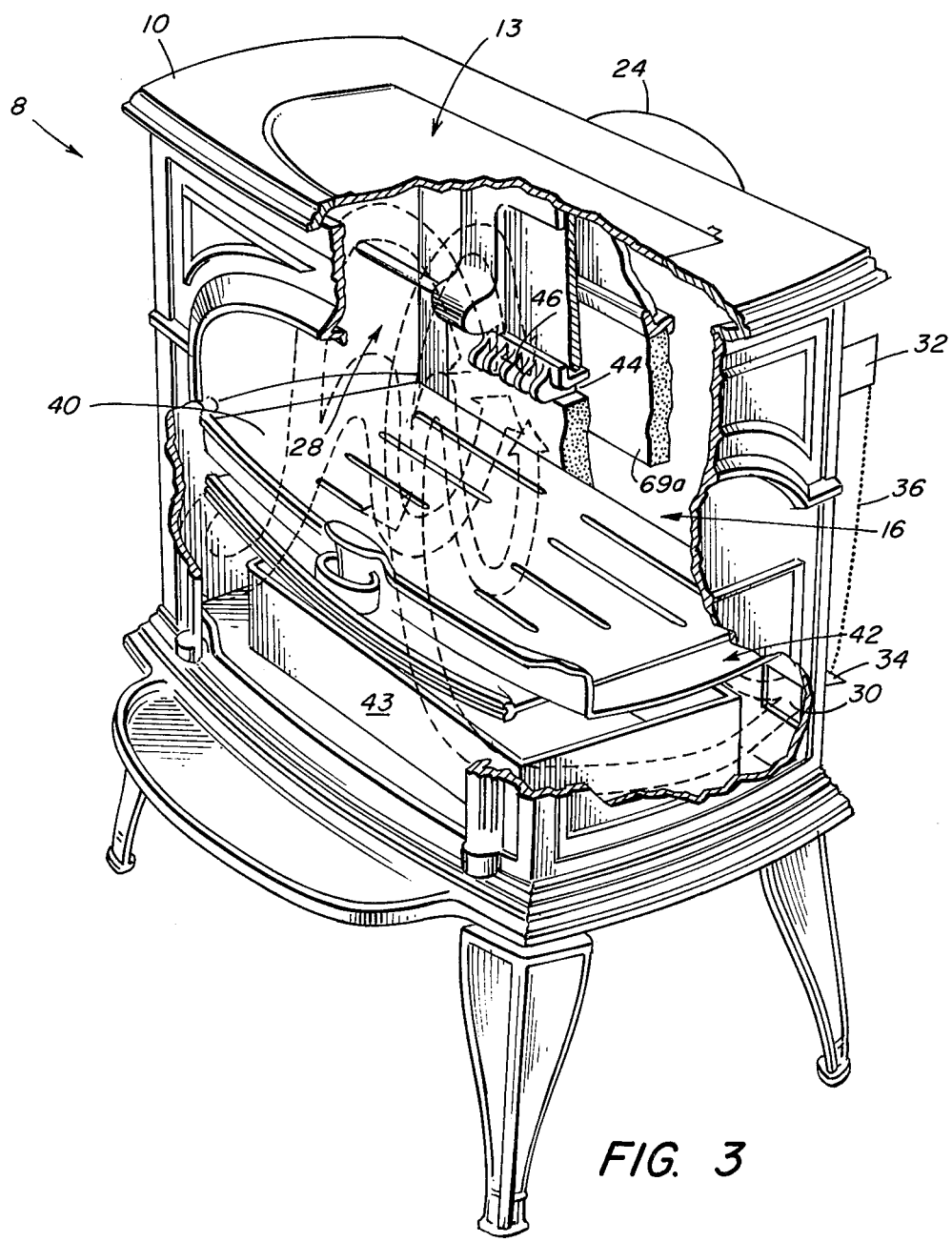
FIG. 3 is a cut-away perspective view of the apparatus of FIG. 1 in a wood burning configuration.
Figure 11:
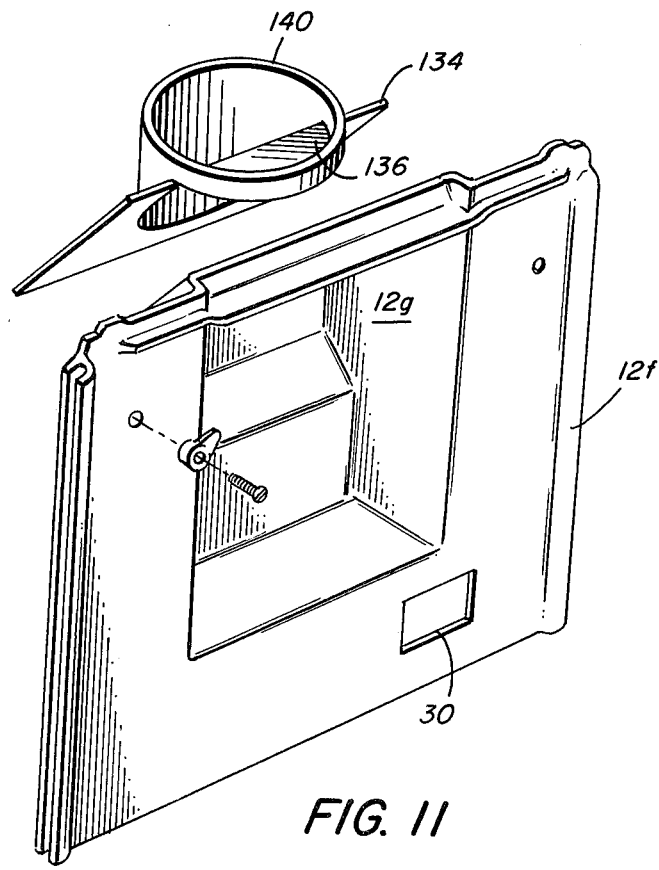
FIG. 11 is an exploded view of the flue collar and rear panel configuration.

Referring to FIGS. 2, 3 and 11, primary air is supplied to the primary combustion chamber 16 through an inlet port 30 at the bottom of the rear panel 12f of the apparatus frame. The primary air supplied through inlet port 30 is controlled thermostatically by a thermostat 32 (FIG. 2), for example a coil of bimetallic material, connected to a shutter 34, covering the inlet port 30, by a flexible chain 36. The primary air entering inlet port 30 divides at the rear of the apparatus and is directed into the primary combustion chamber as described below.

Figure 4:
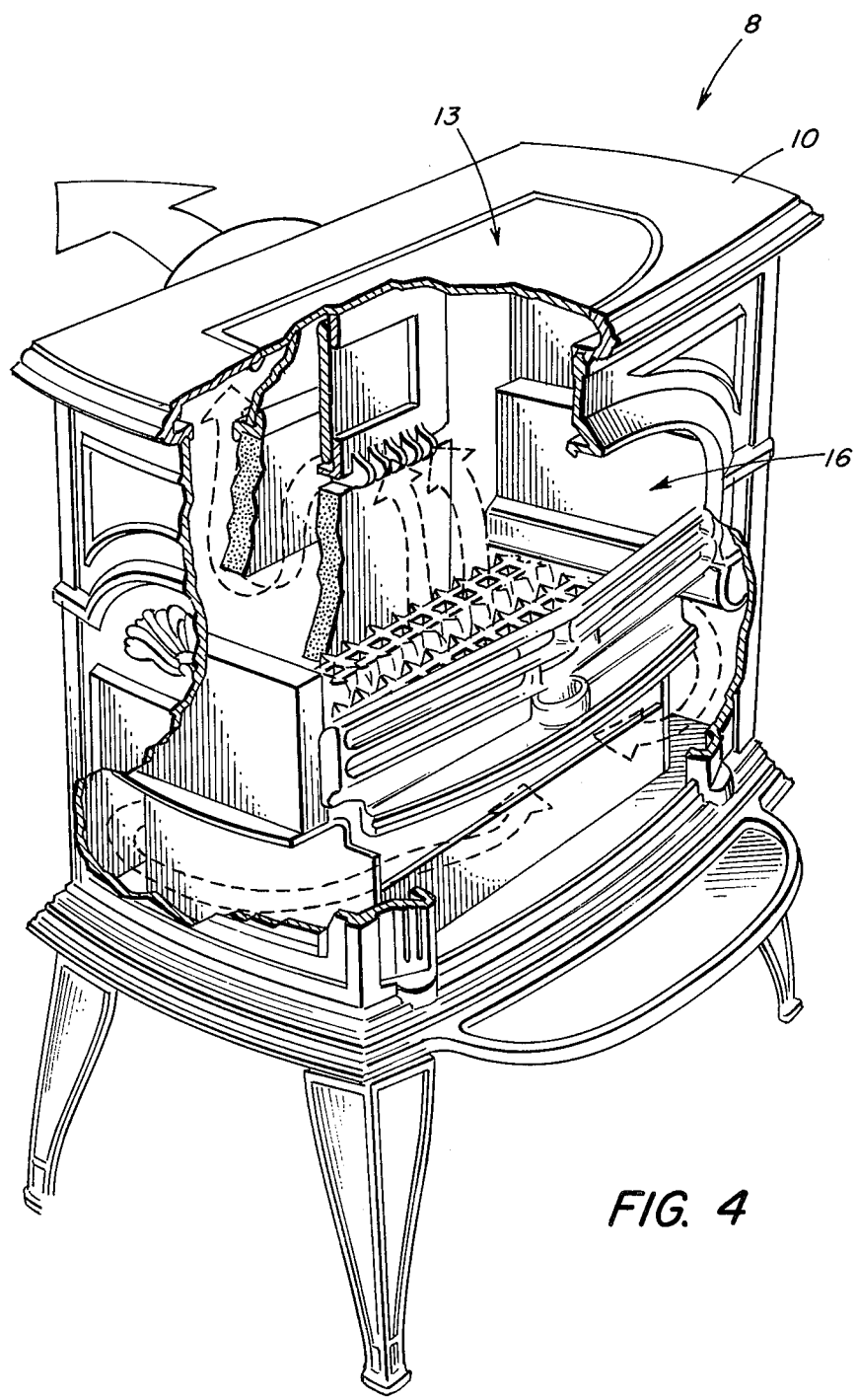
FIG. 4 is a cut-away perspective view of the apparatus of FIG. 1 in a coal burning configuration.

The internal structure of the heating apparatus 8 can be configured, according to the invention, to either operate as a wood burning apparatus (FIG. 3) or a coal burning apparatus (FIG. 4). Substantial portions of the apparatus structure are common to the two methods of fuel combustion operation. The preferred embodiment will be described in detail with reference to the wood burning mode of operation. Thereafter, the changes of components necessary to operate the apparatus as a coal burning stove will be described.

In the illustrated wood burning mode of operation, the primary air entering the rear inlet port of the apparatus is divided between two air paths and is fed along the bottom of the frame assembly at both ends or sides of the apparatus toward the front of the stove. Thus, the primary air substantially encircles the bottom portion of the stove and is preheated during its travel. The primary air paths at the rear of the stove are substantially defined by a rearwardly directed fin 38 (FIG. 5) of baffle 28 (defining the path in conjunction with rear panel 12f and bottom panel 12h); and, at the sides of the stove are defined respectively by side air tube elements 40 and 42 which define the air paths along the bottom sides of the apparatus (in conjunction with the bottom panel and side panels). When the air reaches the front of the apparatus it is directed into a space in front of an ash pan front cover 43 and from there is directed upward along the doors 12d, 12e respectively, to form what will become a substantially laminar air flow across the front doors. The primary air flow is smoothly directed to pass in front of the transparent glass portions 18 of the front doors and thence to pass into the primary combustion chamber 16. The air passing, or washing, across the front door transparent portions 18 maintains those portions substantially clean and unobscured. Furthermore, referring to FIG. 5, as noted above, while a portion 43a of the primary air directed into the primary combustion chamber is consumed and promotes primary combustion of the wood fuel, a second portion 43b of that primary air rises substantially to the top of the primary combustion chamber, is turned or directed rearward, and then travels substantially down the baffle 28 and exits through a baffle opening 44.

The baffle opening 44 extends substantially horizontally and has a plurality of fuel blocking bar elements 46 (FIG. 8) for preventing fuel from passing behind baffle 28. Opening 44 is designed to promote the passage of the oxygen rich primary air 43b which has not become involved with combustion in the primary combustion chamber. This oxygen rich air promotes secondary combustion in the secondary combustion chamber 26. In this way, a separate structurally defined and enclosed, secondary air path is not required and the single primary air path, starting at inlet port 30, provides the air, and control, over the entire combustion process.

Figure 6:
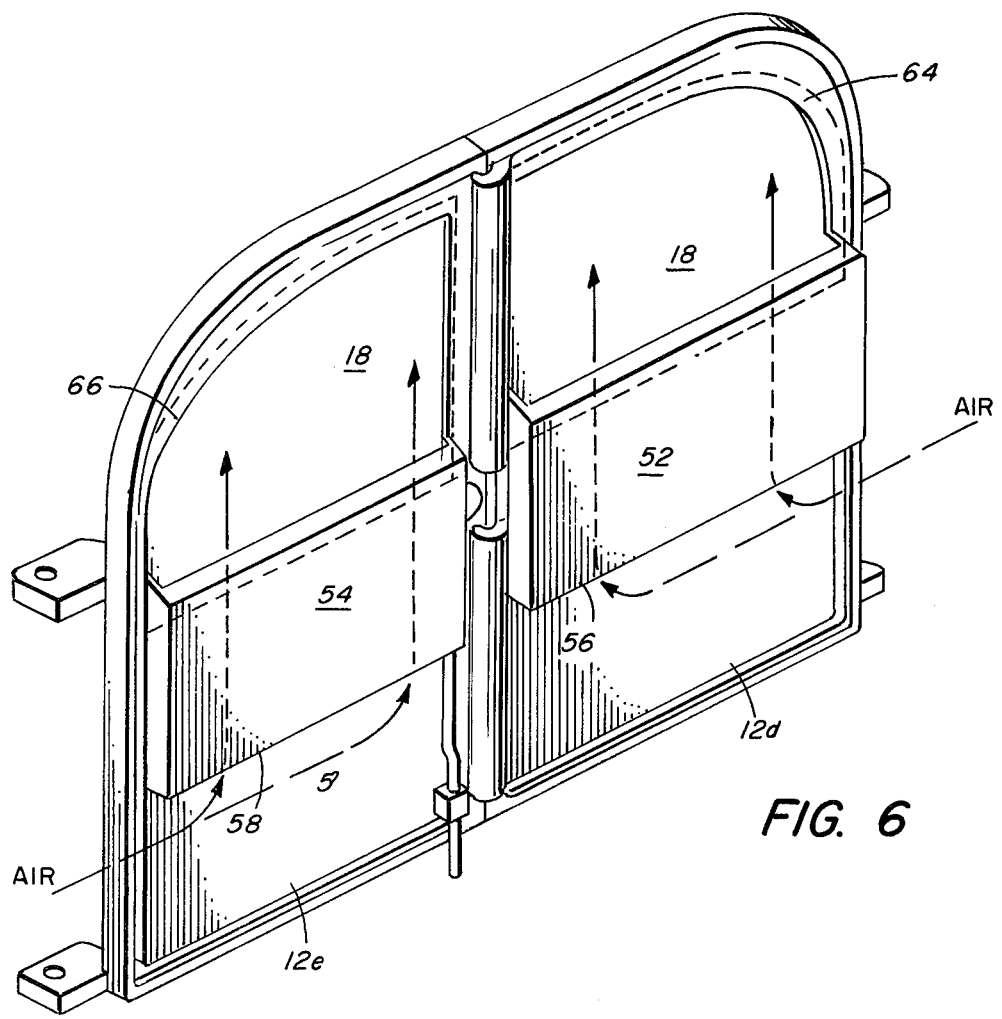
FIG. 6 is a rear perspective view of the door assembly.

As noted above, primary air is directed from the rear inlet port 30 at the bottom of the apparatus, around the interior base of the apparatus through the primary air supply paths defined by air tube elements 40 and 42, to the front of the apparatus wherein the air is directed up and across the transparent portions 18 in doors 12d and 12e. The primary air, is directed across to door surface by a U-shaped bracket and clamp assembly 52 and 54 (FIG. 6) for doors 12d and 12e respectively and is guided by the U-shaped bracket portion 56 and 58 upwardly toward the transparent glass members 18.

Figure 7:
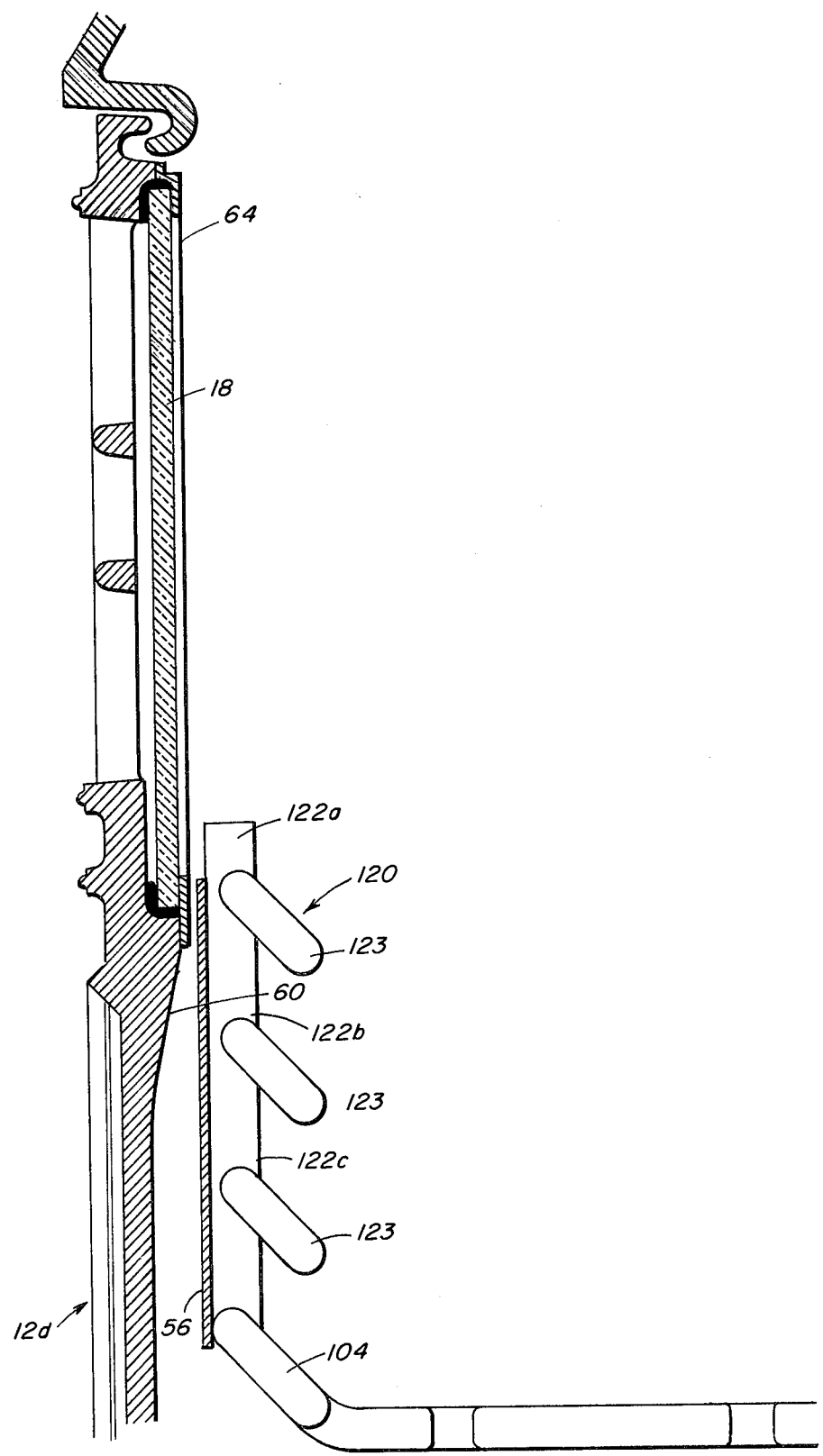
FIG. 7 is a right cross-sectional view through a door of the door assembly.

Referring to FIG. 7, the air, as it traverses the space defined by bracket portion 56 and 58, is "gently" urged by ramp members 60 away from the original plane of travel so that it can smoothly pass between the space defined by bracket portions 56 and 58 and the plane of the glass 18. The air thus effectively provides a laminar flow across the glass 18 effectively insulating the glass from the products of combustion in the primary combustion chamber while at the same time "washing" the glass. The effect is to maintain the glass interior substantially clean and free from obscuration which would normally result but for the air "wash".

The glass members 18 are maintained in position by the clamping effect of the clamp portions 64 and 66 of assemblies 52 and 54 which secure the glass 18 firmly against the cast iron door members 12d and 12e respectively.

Referring to FIG. 5, and as noted above, a portion 43a of the primary air passing across glass members 18 becomes involved with the primary combustion process and a second portion 43b thereof is directed upwardly, across the top of the apparatus, towards the rear panel, and then downwardly along the baffle 28. Also, as noted above, baffle 28, at its baffle opening 44, is configured to urge the oxygen rich, substantially uncombusted, hot circulating air flow into the opening and thence to the secondary combustion chamber 26. To promote this easy flow transition, the baffle 28 at the top portion of opening 44 has a smooth transition section 68 directed toward the secondary combustion chamber. In addition, opening 44 should be properly positioned relative to the top and bottom of the combustion chamber. In the illustrated embodiment, the bottom of opening 44, at the top of a refractory element 69a, is located 7" down from the interior of the top panel 12h. This helps to promote oxygen rich air, effectively secondary air, at the rear of opening 44 in the secondary combustion chamber 26 and thereby promotes combustion therein. Further, in order to promote secondary combustion, refractory elements 69b, 69c are provided to define the elongated air flue gas path behind fireback baffle 28 and within the protruding portion or section 12g of the heating apparatus. Baffle 28, and in particular the upper portion thereof, has tab members integral therewith for helping to secure the refractory material in place. Thus the heat of combustion is better retained in the secondary combustion chamber and results in both high operating temperatures and higher combustion efficiency. The heat of combustion is better retained due to the insulating nature of the refractory elements 69 which define the exit path from opening 44 to flue collar exit aperture 24.

Baffle 28 further has a second opening 70 positioned above opening 44, which, in one mode of combustion, is blocked by the damper 20. It is in this combustion mode that the combusted gases are directed to the secondary combustion chamber and from there through the elongated path to the flue gas exit aperture 24. In the other stable position of damper 20, opening 70 is not blocked and the combusted gases exit substantially directly through the flue gas exit aperture. As described in more detail below, the damper 20 is captured by the baffle 28 so that it has a rotation axis 71 substantially aligned with the plane of baffle 28 and at a position above opening 44 but below opening 70. Damper 20 is rotated by a handle assembly whose axis of rotation is not coaxial with the damper axis of rotation. Thereby, the damper 20 has an elongated slot 72 in a plane normal to the damper axis of rotation which provides a sliding contact with handle rod end portion 74. Thus, as handle 22 rotates, the damper rod end portion 74 rotates and slides in slot 72 causing rotational movement of the damper. The damper assembly thus can be more reliable because there is no fixed rotational connection to the damper. The damper thus either blocks opening 70 or allows gases to pass through opening 70. Preferably, in either stable position of damper 20, the force of gravity on the damper urges the damper to stay in its stable position. This gravity stabilizing relationship is effected by proper placement (or mounting) of the damper rotation axis.

Figure 8:
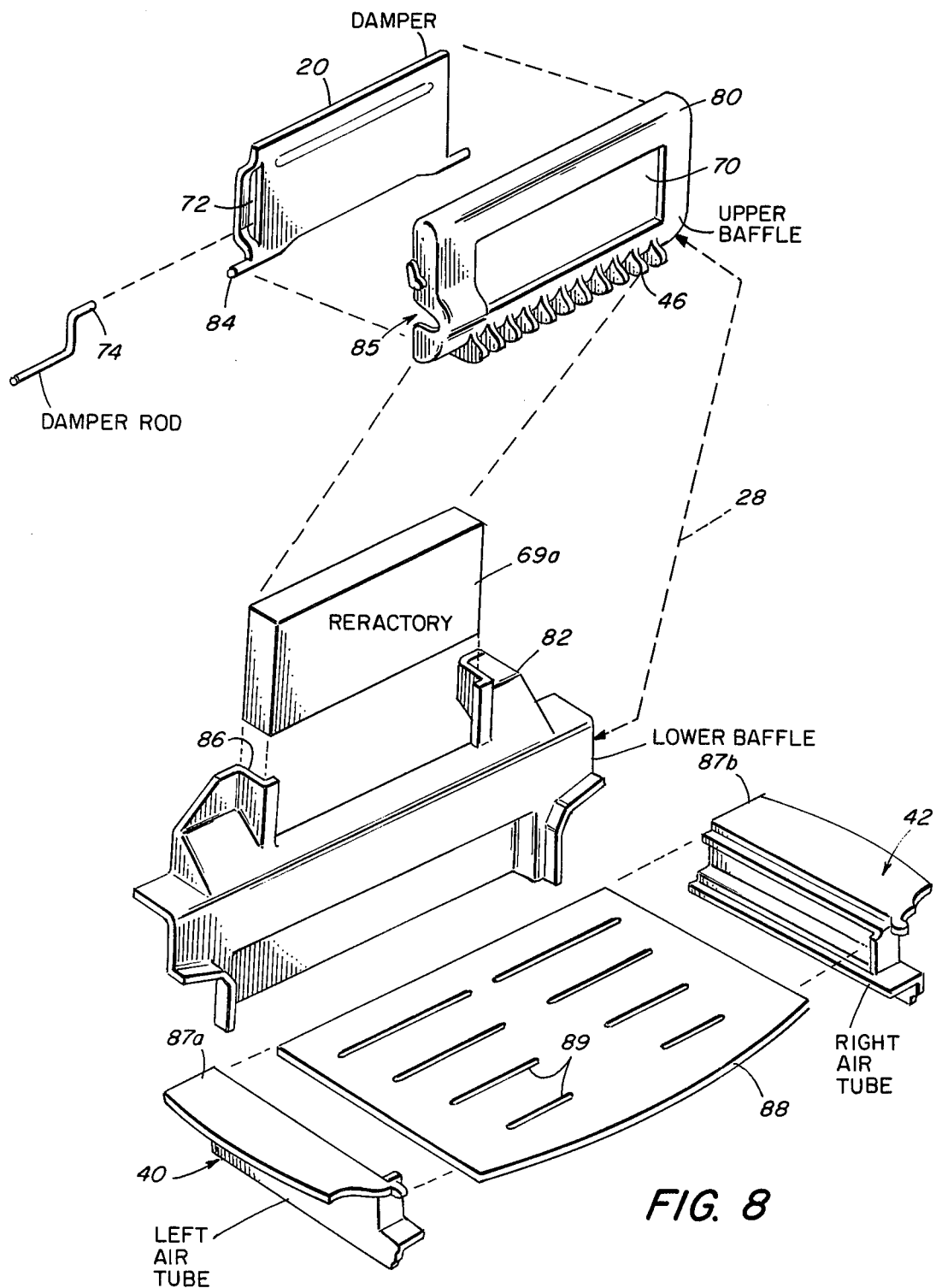
FIG. 8 is an exploded view of the main interior components forming the wood burning configuration of the apparatus according to the invention.

Referring to FIG. 8, in the preferred embodiment of the invention, the fireback baffle 28 has an upper baffle section 80 and a lower baffle section 82. The lower baffle extends the full width of the heating apparatus frame and is spaced from rear frame wall by elements 38 integral with the lower baffle. The upper baffle section effectively only "covers" the protruding section 12g and thus has a width substantially less than the lower baffle section. The upper and lower baffle sections combine however to extend the full height of the frame assembly. The upper baffle section 80 defines the second opening 70 and, in combination with lower baffle section 82, defines the first opening 44. The upper fireback section also enables the "capture" of damper 20 for its rotational movement. The rod ends 84 of damper 20 mount for rotational movement in capturing recesses 85 of the upper baffle section. Thus damper 20 need have a width only as wide as protruding section 12g (and opening 70). The lower fireback 82 further has a recess 86 for capturing refractory element 69a therein. This refractory element helps to absorb much of the heat and relieves some of the stress to which lower baffle 82 would otherwise be subjected. It further provides significant heat to the secondary combustion chamber for enhancing efficient and complete combustion therein.

As shown in FIG. 8, the right and left air tubes 40 and 42 mate with lower baffle 82 along ends 87a, 87b and support thereon a grate base assembly 88 on which the firewood is placed. The grate assembly 88 has therein elongated slots 89. In the illustrated embodiment, the lengths of the slots vary from front to back and the slots provide a path by which wood ash is directed to an ash pan 92 below. The ash pan front cover 43, (FIG. 3) as noted above, engages in sealing relationship with air tubes 40 and 42 and with the grate assembly 88 to complete the air path for primary (and effectively secondary) air.

Figure 9:
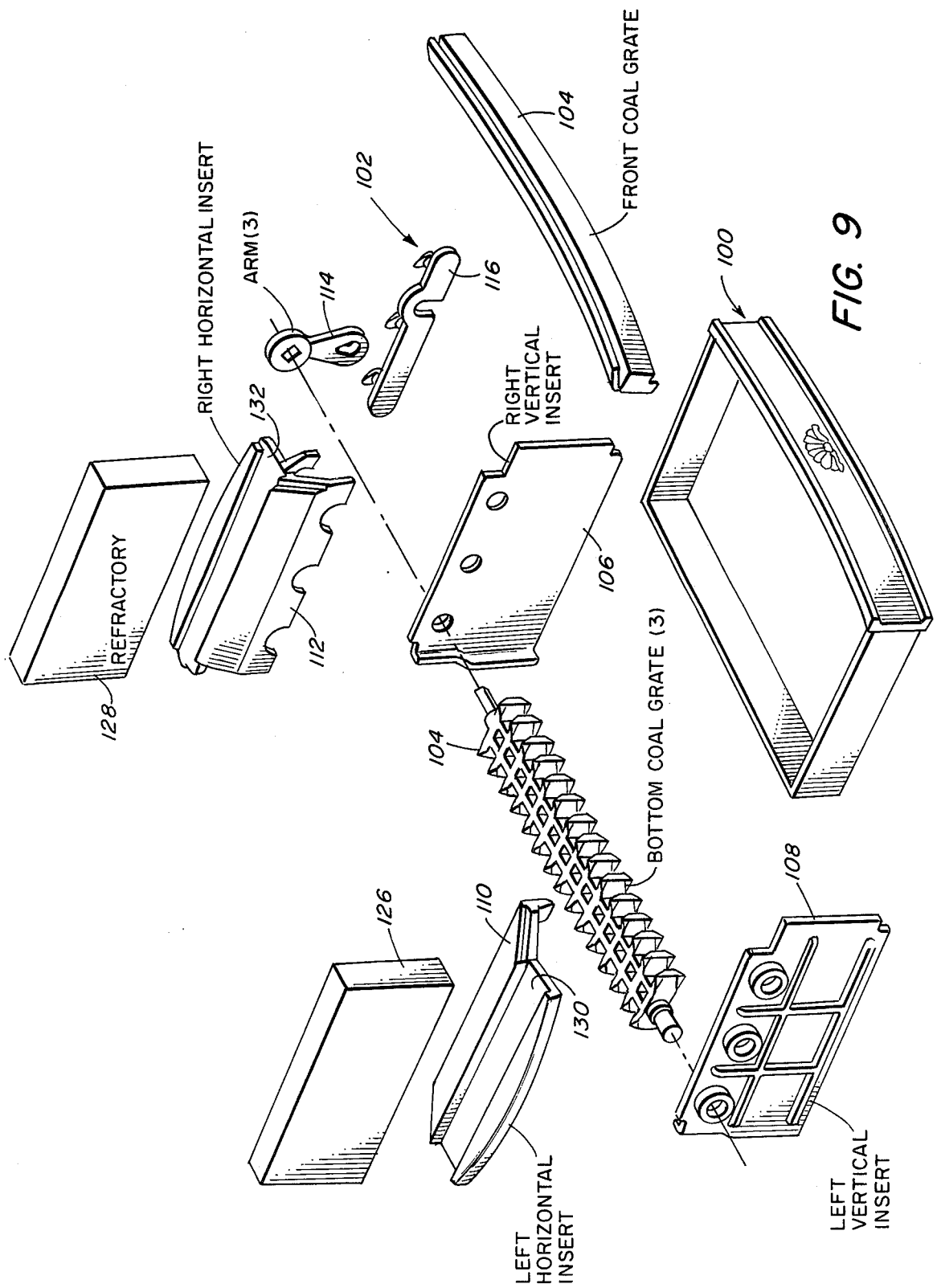
FIG. 9 is an exploded view of the main interior components of the coal burning configuration of the apparatus according to the invention.

When the wood burning apparatus described thus far is converted for coal burning operation, the grate assembly 88, air tubes 40, 42, and the ash pan 92 and its front cover 43, are removed and a separate, and taller, ash pan and ash pan cover 100 with a shaker grate assembly 102 are employed as its replacement (FIG. 9). In this coal burning mode of operation, the primary air no longer is directed up across the front transparent portions 18 of the doors 12d, 12e but is directed beneath the shaker grate assembly (FIG. 4). The sole escape for the primary air (a front grate 104 (FIG. 7) in combination with the coal ash pan cover seals the space between the doors and the shaker grate) is through the shaker grate and into the burning coal. Thus, coal burning is an underfired operation whereas wood burning is an above-fired operation.

Figure 10:
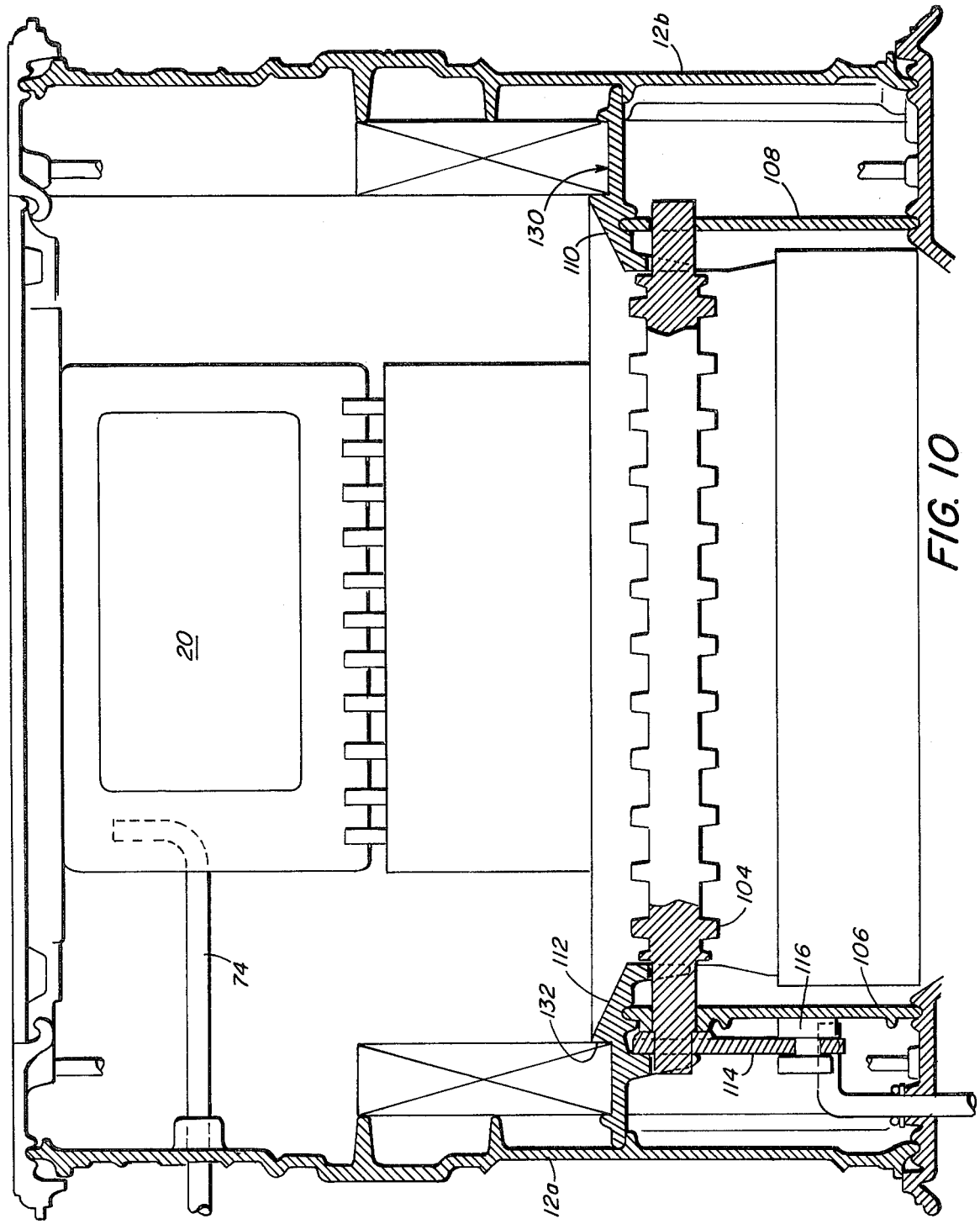
FIG. 10 is a front elevation cross-sectional view of the coal burning configuration of the apparatus.

The shaker grate assembly 102 comprises a plurality of individual shaker elements 105 which are secured for rotation by shaker grate supporting elements 106, 108 resting on the stove bottom 12i (see also FIG. 10). Left and right horizontal inserts 110, 112 effectively lock the shaker grate assembly in position. Horizontal inserts 110, 112, capture and are supported by supporting elements 106, 108 and are further supported by side frame panels 12a, 12b. The shaker grate elements 105 are interconnected through arms 114 to a link member 116 in a manner substantially identical to that described in U.S. Pat. No. 4,279,238, whose disclosure is incorporated herein by reference. In this manner, the shaker grate assembly is secured within the apparatus and primary air is directed beneath the grate assembly 102 in order to properly fire the coal burning portion.

In order to prevent the coal from spilling out at the front of the apparatus when the doors are opened, a multi-tiered grate assembly 120 comprising a plurality of separate but stackable elements 122a, 122b, 122c (FIG. 7) is employed. The elements 122 stack one above the other at the front portion of the primary combustion chamber and each stackable element has a blocking member 123 provided at an angle which is greater than the angle of repose of the coal to be burned. In this manner the coal does not "jump" or pass through the grate assembly 120 and is maintained in the primary combustion chamber.

In the illustrated embodiment, the frame assembly is secured by employing "tie rods" extending from the top to the bottom at each corner of the apparatus. The front tie rods 124 are employed for maintaining the grate assembly 120 in a locked position against the supporting elements 106, 108.

Referring to FIG. 9, the final step in completing the conversion of the apparatus from burning wood to burning coal is the addition of refractory elements 126, 128 situated atop horizontal inserts 110, 112. These refractory elements are placed atop the inserts in a secure mounting in tracks 130, 132 to both protect the side panels 12a, 12b of the frame assembly, and to maintain higher combustion temperatues when burning coal.

As noted above, the illustrated heating apparatus is particularly designed to fit within an average fireplace opening so that at least its rearward portion extends into the firebox. Consequently, it is important to maintain as small a size for the apparatus as possible. In addition, it is equally important to maintain a low profile for the apparatus so that it can be adapted to as many fireplace openings as feasible. The apparatus has therefore been constructed so that the secondary combustion chamber and flue path are fully contained within the protruding section 12g using the configuration noted above. Thus, it is not necessary to extend the entire frame assembly in a rearward direction but only that portion of it needed to adequately effect secondary combustion and the connection from the stove to a required exhaust flue.

Figure 12:
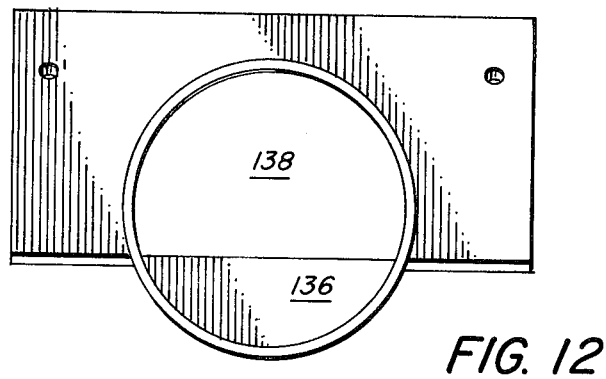
FIG. 12 is a top view of the flue collar of FIG. 11.

In order to maintain the low profile, and in order to provide the apparatus with the flexibility of either a top exiting or rearward exiting flue connection, a flue collar 134 (FIGS. 5 and 11) is specifically adapted to attain and maintain the low profile of the stove while allowing it to be attached to a relatively large flue pipe. The flue collar opening at the frame assembly need not be as large as the flue pipe itself. Therefore the flue collar opening is reduced as shown in FIG. 11 to enable it to attach, in its rearward exiting position, in a manner that is substantially flush with the top of the stove. The structure 136 required to meet this goal cuts off or truncates the opening to form what in cross-section is a partial circle 138 (FIG. 12) at the stove connection and a full round opening at the flue pipe connection 140. In this manner, a 6" flue pipe can be accommodated without the pipe extending above the stove top.

Other objects, features, and advantages of the invention will be obvious to those skilled in the art and are within the scope of the following claims.

What is claimed is:

1. A fuel burning heating apparatus for operating in either a first combustion mode or a second combustion mode comprising
   a heat conducting frame assembly enclosing
      a primary combustion chamber including grate means for supporting a fuel mass directly above means defining an ash collection area, and
      a secondary combustion chamber in gaseous communication with said primary combustion chamber,
   a baffle, a portion of said baffle separating said primary and secondary combustion chambers, and said baffle having a first baffle opening gaseously connecting said primary and secondary combustion chambers for providing said gaseous communication therebetween, a first air supply means for providing air for promoting combustion in said primary combustion chamber, said frame assembly including a door assembly having a transparent portion thereof positioned for visual viewing of combustion in said primary combustion chamber, and said air supply means comprising a controlled ambient air inlet port in a frame panel of said frame assembly, means defining primary air supply paths for directing air from said port along a plurality of separate, closed, elongated paths around said primary combustion chamber and outside said fuel mass and ash collection area toward the door assembly at a front panel of said apparatus, and means for directing said air from said respective paths at said door assembly along an inside surface of said door assembly and across said transparent portion, whereby, before encountering the combustion chamber, controlled, preheated uncombusted air is directed across said transparent portion of said door assembly for maintaining said transparent portion clean and effectively insulated from the products of combustion within said primary combustion chamber and the fuel mass is top-fired.

2. The fuel burning heating apparatus of claim 1 wherein said inlet port is in a rear frame panel of said frame assembly, and said path defining means defines at least first and second paths extending from said port along said rear panel and then respectively along first and second side panels of said frame assembly, said first and second paths substantially encircling said frame assembly.

3. The fuel burning heating apparatus of claim 2 wherein said directing means comprises at least one U-shaped bracket and clamp member having a bracket portion in gaseous communication with a said air path for directing air supplied through said air paths to a said transparent portion, and an integral clamping element for supporting said transparent portion in position on said door assembly.

4. The fuel burning heating apparatus of claim 1 further wherein said baffle comprises an upper baffle member, and a lower baffle member extending substantially across the entire width of said frame, said baffle members together extending substantially the full height of said frame, said baffle members together defining said first baffle opening for operation of said apparatus in said first combustion mode, and said upper baffle defining a second baffle opening for operation in said second combustion mode.

5. The fuel burning heating apparatus of claim 4 further comprising a damper extending less than the full width of said frame, means for mounting said damper for movement between a first position wherein it allows passage of gaseous products of combustion through said second baffle opening to an exit port, and a second position wherein said damper blocks said baffle second opening.

6. The fuel burning heating apparatus of claim 5 further comprising damper moving means for moving said damper between said first and second positions, and said damper mounting means defining a damper axis at an off center position for providing a gravity directed force for urging said damper to stably remain in said first and said second positions.

7. The fuel burning heating apparatus of claim 1 wherein said primary air path defining means comprises a first and a second air tube member extending along said panels of said frame near the bottom of said frame, each said air tube member having a grate holding portion integral therewith, and a grate member, supported by said air tube members, and having a plurality of openings therein for allowing ash to drop into an ashpan resting on the frame bottom.

8. The fuel burning heating apparatus of claim 1 further comprising an elongated flame path, a plurality of removable refractory elements, and means for mounting said refractory elements for defining, in combination with said frame member, said elongated flame path.

9. The fuel burning heating apparatus of claim 1 further comprising means for converting said wood burning heating apparatus to a coal burning heating apparatus, said converting means including a plurality of removable refractory elements, means for positioning at least one of said refractory elements in said primary combustion chamber in a protective position juxtaposed to each frame side panel.

10. The fuel burning heating apparatus of claim 1 wherein said frame assembly further comprises a rear panel, having a protrusion supporting opening therein, side panels, a top panel, a bottom panel, and a rearwardly extending, box-like shaped, secondary combustion supporting, protruding frame section mounted at an upper central position in said supporting opening, said protruding section being accessible from the door assembly of said apparatus and said protruding section having a plurality of removable refractory elements for defining, in combination with said section, a said secondary combustion chamber and a flue path extending therefrom to a flue gas exit aperture.

11. The fuel burning heating apparatus of claim 1 wherein said baffle further comprises, at said opening, means for aiding in the collection of oxygen rich primary air circulating from said primary air supply path through said primary combustion chamber for promoting secondary combustion in said secondary combustion chamber, and said opening extending substantially in a horizontal direction and being positioned at a height for enhancing the collection of said oxygen rich primary air.

12. The fuel burning heating apparatus of claim 1 wherein said baffle comprises
- a lower cast iron baffle member, and
- an upper cast iron baffle member, and
- said lower baffle has integral therewith spacing elements for spacing said lower baffle member from a rear panel of said frame.

13. The fuel burning heating apparatus of claim 12 wherein said upper baffle member comprises integral therein
- means for holding in place refractory elements defining said secondary combustion chamber,
- means for holding in place a rotatable damper element, and
- means for defining a second baffle opening above the first opening and at an upper portion of the apparatus.

14. The fuel burning heating apparatus of claim 1 further comprising
- a damper,
- said baffle having a second baffle opening for operation in said second combustion mode,
- means for mounting said damper for rotational movement, about a damper pivot axis, between a first position wherein said second baffle opening is open and a second position wherein said second baffle opening is blocked,
- a handle assembly for rotating said damper between said first and second positions, said handle assembly having a handle rotation axis which is non-coaxial with said damper rotation axis, and
- said handle assembly having a movement end for engaging said damper at a damper movement slot formed integrally within said damper,
- whereby said handle end slides in said slot as said damper rotates.

15. The fuel burning apparatus of claim 14 further comprising
- means for mounting said handle assembly and said damper so that gravity urges said damper to maintain said first position and said second position, whichever position the damper is in.

16. The fuel burning heating apparatus of claim 1 further comprising
- an ash pan assembly,
- said assembly having a front cover for sealing with further elements of said apparatus for defining said primary air paths.

17. The fuel burning heating apparatus of claim 1 further comprising
- a plurality of tie rods, each extending from a top panel of said apparatus frame to a bottom panel of said apparatus frame,
- a plurality of front grates for defining a fuel bed and for preventing the fuel from impinging upon said door assembly, and
- means for securing said front grates in position, said securing means including at least front ones of said tie rods.

18. The fuel burning heating apparatus of claim 1 wherein said door assembly comprises ramp portions integral therewith for gently directing said air across said transparent portion while maintaining a substantially laminar flow across said transparent portion.

19. A fuel burning heating apparatus for operating in either a first combustion mode or a second combustion mode comprising
- a heat conducting frame assembly enclosing
  - a primary combustion chamber, and
  - a secondary combustion chamber in gaseous communication with said primary combustion chamber,
- a baffle, a portion of said baffle separating said primary and secondary combustion chambers, and
- said baffle having a first baffle opening gaseously connecting said primary and secondary combustion chambers for providing said gaseous communication therebetween,
- a first air supply means for providing air for promoting combustion in said primary combustion chamber,
- said frame assembly including a door assembly, and
- said baffle comprises
  - an upper baffle member, and
  - a lower baffle member extending substantially across the entire width of said frame, said baffle members together extending substantially the full height of said frame,
  - said baffle members together defining said first baffle opening for operation of said apparatus in said first combustion mode, and
  - said upper baffle defining a second baffle opening for operation in said second combustion mode.

20. A fuel burning heating apparatus for operating in either a first combustion mode or a second combustion mode comprising
- a heat conducting frame assembly enclosing
  - a primary combustion chamber, and
  - a secondary combustion chamber in gaseous communication with said primary combustion chamber,
- a baffle, a portion of said baffle separating said primary and secondary combustion chambers, and
- said baffle having a first baffle opening gaseously connecting said primary and secondary combustion chambers for providing said gaseous communication therebetween,
- a first air supply means for providing air for promoting combustion in said primary combustion chamber,
- said frame member including a door assembly, and
- said frame assembly further comprises
  - a rear panel, having a protrusion supporting opening therein,
  - side panels,
  - a top panel,
  - a bottom panel, and
  - a rearwardly extending, box-like shaped, secondary combustion supporting, protruding frame section mounted at an upper central position in said supporting opening, said protruding section being accessible from the door assembly of said apparatus and said protruding section having a plurality of removable refractory elements for defining, in combination with said section, a said secondary combustion chamber and a flue path extending therefrom to a flue gas exit aperture.

21. A fuel burning heating apparatus for operating in either a first combustion mode or a second combustion mode comprising
- a heat conducting frame assembly enclosing
  - a primary combustion chamber, and a secondary combustion chamber in gaseous communication with said primary combustion chamber, a baffle, a portion of said baffle separating said primary and secondary combustion chambers, and said baffle having a first baffle opening gaseously connecting said primary and secondary combustion chambers for providing said gaseous communication therebetween, a first air supply means for providing air for promoting combustion in said primary combustion chamber, said frame assembly including a door assembly, and said baffle further comprising, at said opening, means for aiding in the collection of oxygen rich primary air circulating from said primary air supply path through said primary combustion chamber for promoting secondary combustion in said secondary combustion chamber, and said opening extending substantially in a horizontal direction and being positioned at a height for enhancing the collection of said oxygen rich primary air.

22. A fuel burning heating apparatus for operating in either a first combustion mode or a second combustion mode comprising a heat conducting frame assembly enclosing
a primary combustion chamber, and
a secondary combustion chamber in gaseous communication with said primary combustion chamber, a baffle, a portion of said baffle separating said primary and secondary combustion chambers, and said baffle having a first baffle opening gaseously connecting said primary and secondary combustion chambers for providing said gaseous communication therebetween, a first air supply means for providing air for promoting combustion in said primary combustion chamber, said frame assembly including a door assembly,
a damper,
said baffle having a second baffle opening for operation in said second combustion mode, means for mounting said damper for rotational movement, about a damper pivot axis, between a first position wherein said second baffle opening is open and a second position wherein said second baffle opening is blocked, a handle assembly for rotating said damper between said first and second positions, said handle assembly having a handle rotation axis which is non-coaxial with said damper rotation axis, and said handle assembly having a movement end for engaging said damper at a damper movement slot formed integrally within said damper, whereby said handle end slides in said slot as said damper rotates.

23. A fuel burning heating apparatus for operating in either a first combustion mode or a second combustion mode comprising a heat conducting frame assembly enclosing
a primary combustion chamber, and
a secondary combustion chamber in gaseous communication with said primary combustion chamber, a baffle, a portion of said baffle separating said primary and secondary combustion chambers, and said baffle having a first baffle opening gaseously connecting said primary and secondary combustion chambers for providing said gaseous communication therebetween, a first air supply means for providing air for promoting combustion in said primary combustion chamber, said frame assembly including a door assembly, a plurality of tie rods, each extending from a top panel of said apparatus frame to a bottom panel of said apparatus frame, a plurality of front grates for defining a fuel bed and for preventing the fuel from impinging upon said door assembly, and means for securing said front grates in position, said securing means including at least front ones of said tie rods.

24. An airtight top-fired solid fuel burning heating appliance, comprising a heat conducting enclosure having a flue outlet and a single combustion air inlet, means for thermostatically controlling said inlet, means within said enclosure defining separate primary and secondary combustion chambers, a viewing window sealingly mounted in an opening to the primary combustion chamber formed in said enclosure, means defining at least one substantially closed passage around the primary combustion chamber from said inlet to the lower edge of said window, means for directing uncontaminated preheated air exiting said passage upwards across said window, means defining a connecting passageway between said primary and secondary combustion chambers, means defining lower primary and upper secondary combustion air flow paths within said primary combustion chamber diverging from the air traversing said window, the primary air path leading directly back down into the adjacent fuel mass and the secondary air path flowing upwards along the periphery of the primary combustion chamber and back through said passageway substantially without entering into combustion in the primary combustion chamber, whereby substantially all of the combustion air entering through said controlled inlet is directed across the window before diverging into primary and secondary air paths so that adequate preheated pure air flow across the viewing window is sustained even at the lowest air supply levels.

25. The appliance of claim 24, wherein said primary combustion chamber includes grate means for supporting the fuel mass and directly therebelow, means defining an ash collection area, said passage around said primary combustion chamber extending alongside said ash collection area.

26. The appliance of claim 24, further comprising
grate means for supporting said fuel mass in said primary combustion chamber, a removable, open top, sidewalled ash pan received between said grate means and the bottom of said enclosure, said combustion air passage being defined between the exterior of the sidewalls of said ash pan and the interior of said enclosure, such that said passage at least partially encircles said ash pan.

* * * * *